United States Patent Office 3,069,444
Patented Dec. 18, 1962

3,069,444
5,5'-D' LOWER ALKYL-10,10'-SPIROBIPHENYL PHENAZA GROUP IVA METAL COMPOUNDS AND PROCESS OF PREPARING SAME
David Wasserman, Springfield, and Robert E. Jones, Rahway, N.J., assignors to Merck & Co., Inc., Rahway, N.J., a corporation of New Jersey
No Drawing. Filed Feb. 23, 1961, Ser. No. 90,965
33 Claims. (Cl. 260—429)

This invention relates to antioxidants for high temperature lubricants and more particularly to a new process for making derivatives of spirobiphenylphenazasiline.

Phenazasiline compounds have been found to be useful as antioxidants in high temperature lubricants, particularly those of the synthetic ester type. The compound 5-ethyl-10,10-diphenylphenazasiline, for example, is capable of withstanding temperatures in the range of 400° F. and higher. The effectiveness of phenazasiline compounds is believed in part to be due to the presence of a diphenylamine grouping in the molecule. In the case of the spirobiphenylphenazasilines, the effect is enhanced by the presence of an additional diphenylamine residue in the silicon containing molecule.

Accordingly, an object of the present invention is to provide an improved synthesis for spirobiphenylphenazasiline derivatives, such as 5,5'-diethyl-10,10'-spirobiphenylphenazasiline.

Another object of this invention is to prepare novel compounds which are useful as intermediates in the formation of spirobiphenylphenazasiline derivatives.

These and other objects will appear more fully in the disclosure which follows:

According to the present invention there is provided a new and improved process for making spirobiphenylphenazasiline analogs having the general formula

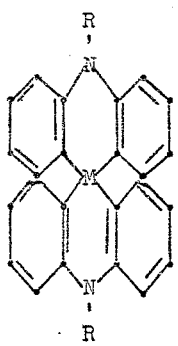

where R is a lower alkyl radical and M is a group IV metal including silicon, lead, germanium and tin. These compounds are useful as antioxidants in high temperature lubricants, particularly low molecular weight esters of polyhydroxy alcohols. The addition of a phenylphenazasiline derivative to such esters is necessary to prevent oxidation at the high temperature at which these lubricants function.

Novel intermediates having the formula

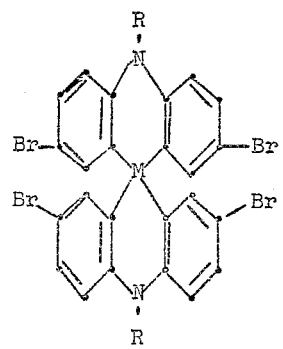

where R and M are as previously defined, are formed according to this invention.

In the following flow sheet, which illustrates the novel process of this invention, and in the accompanying description hereinafter, reference will be made to the formation of silicon compounds, although it will be understood that corresponding metals previously mentioned may be used as well.

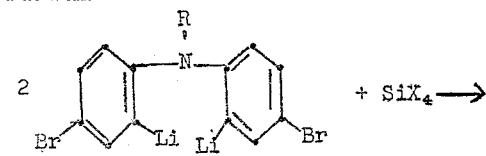

I

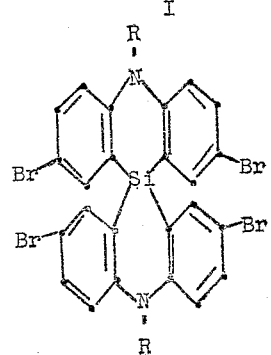

II $\dfrac{Pd-C}{warm} + 4H_2$

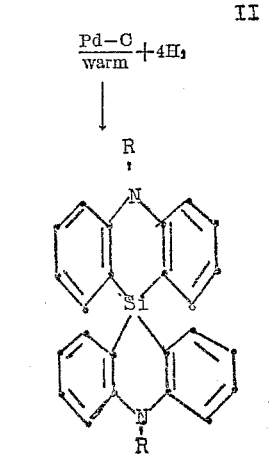

III

The starting compound I may be prepared in the following manner. Diphenylamine is brominated with either bromine or with a brominating agent such as N-bromoacetamide or N-bromosuccinimide or other reagent having a positive bromine atom, thereby forming 2,2',4,4'-tetrabromo-diphenylamine (I). This compound is then alkylated to form 2,2',4,4'-tetrabromo-N-(lower alkyl) diphenylamine (II). Examples of the compounds thus formed are 2,2',4,4'-tetrabromo-N-methyldiphenylamine and 2,2',4,4'-tetrabromo-N-ethyldiphenylamine. The N-propyl and and N-butyl homologs can be similarly prepared. A suitable method of making these compounds is to react 2,2',4,4'-tetrabromodiphenylamine with methyl lithium followed by a dialkyl sulfate such as dimethyl sulfate. For instance, 2,2',4,4'-tetrabromo-N-ethyldiphenylamine can be prepared by reacting diphenylamine with about four moles of bromine, and reacting the resulting 2,2',4,4'-tetrabromodiphenylamine successively with methyl lithium and diethyl sulfate, thereby forming 2,2'4,4'-tetrabromo-N-ethyldiphenylamine. Alternatively compounds II can be formed by direct alkylation with a lower alkyl bromide such as methyl bromide or ethyl bromide.

The 2,2',4,4'-tetrabromo-N-(lower alkyl)-diphenyl amine (II) is reacted with about two moles of a straight chain lower alkyl lithium containing from 2 to 10 carbon atoms, such as butyl lithium, ethyl lithium, propyl lithium, pentyl lithium, hexyl lithium, decyl lithium and the like, at a temperature not over about 10° C. and preferably about 0° C., in order to form a 4,4'-dibromo-2,2'-dilithio-N-(lower alkyl) diphenylamine (III). Under these conditions there is a highly selective replacement of the bromine atoms at the 2 and 2' positions with lithium, while the 4 and 4' bromine atoms are not attacked. Specific compounds which can be formed according to this reaction include 4,4'-dibromo-N-ethyl-2,2'-dilithio-diphenylamine and 4,4'-dibromo-2,2'-dilithio-N-methyl-diphenylamine. This reaction is carried out in an anhydrous organic solvent such as tetrahydrofuran. An inert atmosphere such as nitrogen or argon covers the reaction medium. It is essential to exclude both oxygen and water from the reaction in view of the reactivity of the alkyl lithium.

Two equivalents of the 4,4'-dibromo-2,2'-dilithio-N-(lower alkyl) diphenylamine (III) are then reacted with one equivalent of a compound having the formula, $SiX_4$, where X is a halogen having an atomic weight in the range of 35 to 80, such as silicon tetrachloride. The product of this reaction (II) is a 2,2',8,8'-tetrabromo-5,5'-dialkyl 10,10'-spirobiphenylphenazasiline.

This step may be illustrated specifically with reference to the reaction of 4,4'-dibromo-N-ethyl-2,2'-dilithiodiphenylamine with silicon tetrachloride to form 2,2',8,8'-tetrabromo-5,5'-diethyl-10,10'-spirobiphenylphenazasiline. The reaction is preferably conducted at low temperatures, suitably at about −5° C. in an anhydrous organic solvent, such as ether.

The final step in the process is the debromination of (II) to form the desired end product, 5,5'-dialkyl-10,10'-spirobiphenylphenazasiline (III). The step may be carried out conveniently by reacting (II) with hydrogen at superatmospheric pressure at 40 p.s.i.g. in the presence of a suitable catalyst. By way of illustration 2,2'8,8'-tetrabromo-10,10'-diethyl-spirobiphenylphenazasiline may be converted to 5,5'-diethyl-10,10'-spirobiphenylphenazasiline by hydrogenation over a warmed palladium-carbon catalyst in the presence of an acid acceptor.

This invention will be illustrated in detail with respect to the specific examples which follow.

EXAMPLE I

*2,2',4,4'-Tetrabromo-N-Ethyl-Diphenylamine*

A solution of 42.3 g. (0.25 mole) of diphenylamine in 300 cc. of chloroform is placed in a 1-liter, 3-neck flask equipped with stirrer, thermometer well, condenser, addition funnel, and gas trap. A solution of 159.8 g. (1 mole) of bromine in 140 cc. of glacial acetic acid is added dropwise at the rate of 4 drops per second at room temperature until about 35 cc. had been added. The heat of reaction raises the temperature to 60° C. in 5 minutes. After the initial formation of a solid the solution again becomes clear, and then a voluminous precipitation is formed. The remainder of the solution of bromine in acetic acid is added while the reaction temperature is maintained at 50–60° C. Water is then added, and the reaction mixture is stirred 15 minutes and filtered at 35° C. through a fritted glass Buchner funnel. The filtrate is cooled to 0° C., yielding a second crop of crystals. The combined yield is 115.5 g. (95.5%). Recrystallization from toluene at 0° C. yields 110.5 g. (91.5%) of pure 2,2',4,4'-tetrabromodiphenylamine, M.P. 188.5–189.5° C.

Methyl lithium for use in this example is prepared as follows: Into a 1-liter, 3-neck flask equipped with stirrer, addition funnel, addition tube, condenser and nitrogen inlet tube is placed 10 cc. (about 0.418 g.) of lithium wire in 150 cc. of sodium-dried diethyl ether. The flask is purged with nitrogen and a slow stream of this gas is bubbled through the solvent. About 80 drops of solution consisting of 70.9 (0.5 mole) of methyl iodide in 150 cc. of sodium-dried diethyl ether is added to the lithium. The solution becomes hazy, indicating initiation of the reaction. The rest of the solution of methyl iodide in diethyl ether is added in 90 minutes at a rate sufficient to maintain gentle reflux of the reaction solvent without external cooling. When the addition of methyl iodide is complete, the flask is heated at reflux temperature for 45 minutes. The solution is cooled and filtered through a glass wool plug into a 1-liter flask previously purged of air with dry nitrogen. The flask and filter are washed with 150 cc. of diethyl ether. The flask containing the filtrate is rubber stoppered and secured with a wire strap and allowed to stand overnight at 0° C. A 5 cc. aliquot of the clear supernatant solution is titrated with 1.004 N sulfuric acid. Titration indicated that the concentration of methyl lithium was 0.896 N.

A suspension of 48.5 g. (0.1 mole) of 2,2',4,4'-tetrabromodiphenylamine in 250 g. of dry tetrahydrofuran is placed in a 500 cc. 3-neck flask equipped with stirrer, addition tube, nitrogen inlet tube, addition funnel, and condenser, which has been purged with nitrogen gas. About 116 cc. of the solution of methyl lithium in ether made as described in the preceding paragraph (containing 0.104 moles of methyl lithium) is added dropwise at 20 to 24° C. using external cooling. Evolution of methane gas indicates reaction of the methyl lithium. The reaction mixture is distilled to an overhead boiling point of 65° C. removing the ether and about 221 g. of tetrahydrofuran. A solution of 15.4 g. (0.1 mole) of diethyl sulfate in 20 g. of dry tetrahydrofuran, plus an additional 125 cc. of dry tetrahydrofuran is added. After refluxing for 20 hours most of the solvent is recovered by vacuum distillation. To the reaction mass is added 250 cc. of water, and the mixture is heated for 30 minutes at 95° C. to destroy the excess diethyl sulfate. About 225 cc. of toluene is added to the aqueous portion of the product and heated with stirring. The aqueous layer is separated. The remainder of the water is removed from the toluene solution by azeotropic distillation using a Dean-Stark water trap. The deposited salts are removed by filtration and washed with 25 cc. of toluene. The combined filtrates are cooled to 4° C. for 3 hours and the solid filtered. The solid weighs 20 g. and melts at 129–134° C. The mother liquor is evaporated to yield 28 g. of solid, which is recrystallized from 150 g. of butanol to yield 25.5 g. of product melting at 126–134° C. The product is recrystallized 3 times from dimethylformamide to yield 20.1 g. (39%): M.P. 136.5–138.5° C. $\lambda_{max}$ 2950, E% 296.

*Analysis.*—Br, Calculated: 62.30%. Found: 62.41%.

The compound 2,2',4,4'-tetrabromo-N-methyl-diphenyl-amine can be prepared according to the procedure of Example 2 substituting an equivalent quantity of dimethyl sulfate for diethyl sulfate.

EXAMPLE II

2,2',8,8'-Tetrabromo-5,5'-Diethyl-10,10'-Spirobiphenyl-Phenazasiline 115.2 g. (0.225 mole) of 2,2',4,4'-tetrabromo-N-ethyl-diphenylamine in 675 ml., etc. of ethyl ether is charged in a 3-liter round bottom flask fitted with an agitator, thermometer, nitrogen gas inlet and an additional funnel. All openings are protected with drying tubes. The mixture is stirred at about −5° C. while 500 ml. of an 0.90 N solution of N-butyl lithium is slowly added during about 50 minutes. The solution is aged for 1.25 hours. A solution of 19.6 g. (0.1152 mole) of silicon tetrachloride in 90 ml. of ethyl ether is then slowly added at −30° C. over a period of 30 minutes. The resulting suspension is allowed to cool to room temperature and then aged for about 19 hours. The reaction mixture is quenched with 500 ml. of water and then stirred well for 15 to 20 minutes. The excess organic lithium reagent thereupon is consumed by reaction with the water. The white solids produced thereby are filtered and washed with water and a small amount of ether. The solids upon extraction and recrystallization from ether yielded 62.0 g. of 2,2',8,8'-tetrabromo-5,5'-diethyl-10,10'-spirobiphenyl-phenazasiline (75.1%) M.P. 275–276.5° C.

E% = 175 at 3580; 141 at 3425; 331 at 3210; 415 at 2920; 173 at 2600; (shd.); 211 at 2500 (infl.); and 873 at 2190.
Calc.: C, 45.8; H, 3.02; Br, 43.4.
Found: C, 45.46; H, 3.46; Br, 42.32.

Following the procedure described in detail above and using an equivalent amount of germanium tetrachloride, stannic tetrachloride and lead tetrachloride in place of silicon tetrachloride, 2,2',8,8'-tetrabromo-5,5'-diethyl-10,10'-spirobiphenylphenazagermine, stannine and plumbine are produced.

EXAMPLE III

5,5'-Diethyl-10,10'-Spirobiphenylphenazasiline

A hydrogenation bottle is loaded with 7.34 g. (0.01 mole) of pure 2,2',8,8'-tetrabromo-10,10'-diethyl-spirobiphenylphenazasiline in 100 ml. of benzene. To this is added a solution of 2.9 g. (0.06 mole) of potassium acetate in 60 ml. of ethanol. The mixture is hydrogenated with 5 g. of palladium on a 5% charcoal catalyst at about 60° C. and 40 p.s.i.g. of hydrogen pressure. The reaction time is about 1.75 hours. The catalyst is filtered and the cake washed well with benzene. The filtrate is concentrated to a dry residue. The crude product weighs 4.0 g. and melts at 210–214° C. The Beilstein test for halogen is negative. Concentration of the crude product from ethyl acetate yields 3.4 g. (81%) of 5,5'-diethyl-10,10'-spirobiphenylphenazasilane, M.P. 214–216° C., E% = 368 at 3420, 258 at 3300, 486 at 3070, 529 at 2830 and 1378 at 2230.

Following the procedure described in detail above and using an equivalent amount of germanium tetrachloride, stannic tetrachloride and lead tetrachloride in place of silicon tetrachloride, 5,5' - diethyl - 10,10'-spirobiphenyl-phenazagermine, stannine and plumbine are produced.

While the invention has been described with particular reference to certain embodiments thereof, it will be apparent to those skilled in the art to other modifications within the scope of the invention may be made.

We claim:
1. A process for preparing a compound having the formula

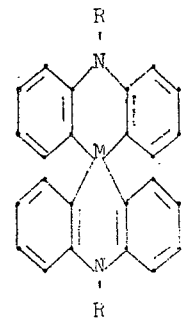

where R is a lower alkyl radical and M is a group IV metal selected from the group consisting of silicon, lead, germanium and tin which comprises reacting two equivalents of 4,4'-dibromo-2,2'-dilithio-N-(lower alkyl)diphenylamine with one equivalent of a compound having the formula $$MX_4$$

where M is defined as above and X is a halogen having an atomic weight from 35 to 80, thereby forming a compound having the formula

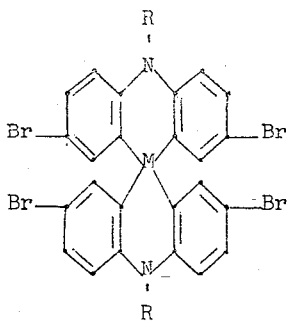

and hydrogenating said compound to form a compound having the formula

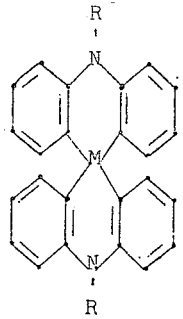

2. A process in accordance with claim 1 wherein M is silicon.
3. A process in accordance with claim 1 wherein M is germanium.
4. A process in accordance with claim 1 wherein M is tin.
5. A process in accordance with claim 1 wherein M is lead.
6. A process in accordance with claim 1 wherein X is chlorine.
7. A process in accordance with claim 1 wherein R is ethyl.
8. A process for preparing 5,5'-diethyl-10,10'-spirobiphenylphenazasiline which comprises reacting two equivalents of 4,4'-dibromo-2,2'-dilithio-N-(lower ethyl)diphenylamine with one equivalent of silicon tetrachloride to form 2,2',8,8'-tetrabromo-5,5'-diethyl-10,10'-spirobiphenylphenazasiline and hydrogenating said compound to form the 4,4'-dibromo-2,2'-dilithio-N-(lower alkyl)-phenylamine of this claim.

9. A process in accordance with claim 8 wherein the hydrogenation is carried out in the presence of an acid acceptor.

10. A process for preparing compounds having the formula

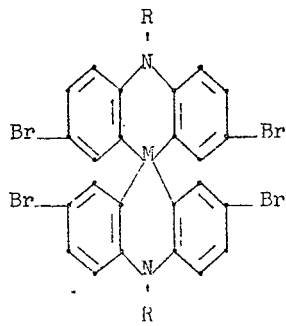

where R is a lower alkyl radical and M is a group IV metal selected from the group consisting of silicon, lead, germanium and tin which comprises reacting two equivalents of 4,4'-dibromo-2,2'-dilithio-N-(lower alkyl) diphenylamine with one equivalent of a compound having the formula

MX₄ where M is defined as above and X is a halogen having an atomic weight from 35 to 80.

11. A process in accordance with claim 10 wherein M is silicon.

12. A process in accordance with claim 10 wherein M is germanium.

13. A process in accordance with claim 10 wherein M is tin.

14. A process in accordance with claim 10 wherein M is lead.

15. A process in accordance with claim 10 wherein X is chlorine.

16. A process in accordance with claim 10 wherein R is ethyl.

17. A process for preparing 2,2',8,8'-tetrabromo-5,5'-diethyl-10,10'-spirobiphenylphenazasiline which comprises reacting two equivalents of 4,4'-dibromo-2,2'-dilithio-N-ethyl-diphenylamine with one equivalent of silicon tetrachloride to form thereby 2,2',8,8'-tetrabromo-5,5'-diethyl-10,10'-spirobiphenylphenazasiline.

18. A process in accordance with claim 17 wherein said reaction is carried out at about −5° C. in an anhydrous organic solvent.

19. A process for preparing a compound having the formula

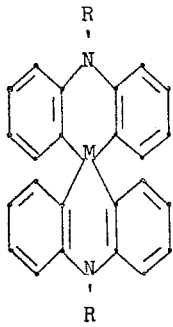

where R is a lower alkyl radical and M is a group IV metal selected from the group consisting of silicon, lead, germanium and tin which comprises hydrogenating a compound having the formula

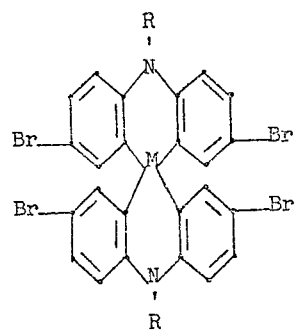

where R and M are as previously defined to form thereby said compound.

20. A process in accordance with claim 19 wherein M is silicon.

21. A process in accordance with claim 19 wherein M is germanium.

22. A process in accordance with claim 19 wherein M is tin.

23. A process in accordance with claim 19 wherein M is lead.

24. A process in accordance with claim 19 wherein R is ethyl.

25. A process in accordance with claim 19 wherein the hydrogenation is carried out in the presence of an acid acceptor.

26. A process in accordance with claim 19 wherein the hydrogenation is carried out over a warmed palladium-carbon catalyst in the presence of an acid acceptor.

27. Compounds having the formula

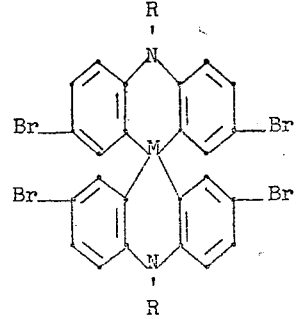

where R is a lower alkyl radical and M is selected from the group consisting of silicon, germanium, tin and lead.

28. A compound in accordance with claim 27 wherein M is germanium.

29. A compound in accordance with claim 27 wherein M is tin.

30. A compound in accordance with claim 27 wherein M is lead.

31. A compound in accordance with claim 27 wherein R is ethyl.

32. 2,2',8,8'-tetrabromo-5,5'-diethyl - 10,10' - spirobiphenylphenazasiline.

33. A compound in accordance with claim 27 wherein M is silicon.

References Cited in the file of this patent

Gilman et al.: J.A.C.S. 79, 6339–6340 (Dec. 5, 1957).
Kuivila et al.: J.A.C.S. 80, No. 13, 3250–3253 (July 5, 1958).
Fuchs et al.: Recueil Trav. Chem. 78, No. 7, 566–569 (July 1959).
Hill et al.: "Org. Chem." Blackiston Co. (Phila.) (1945), p. 168.